US010594828B2

(12) United States Patent
Chou et al.

(10) Patent No.: US 10,594,828 B2
(45) Date of Patent: Mar. 17, 2020

(54) DELIVERY OF INCREMENTAL SENSOR DATA OVER OPTIMIZED CHANNEL

(71) Applicant: INTERNATIONAL BUSINESS MACHINES CORPORATION, Armonk, NY (US)

(72) Inventors: Wei-Ting Chou, Taipei (TW); Chih-Hsiung Liu, Taipei (TW); Xin Peng Liu, Beijing (CN); Hao-Ting Shih, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 15/132,509

(22) Filed: Apr. 19, 2016

(65) Prior Publication Data
US 2017/0302756 A1 Oct. 19, 2017

(51) Int. Cl.
H04L 29/06 (2006.01)
H04L 29/08 (2006.01)
H04L 12/66 (2006.01)

(52) U.S. Cl.
CPC .......... H04L 67/2852 (2013.01); H04L 12/66 (2013.01); H04L 67/2823 (2013.01); H04L 67/2828 (2013.01); H04L 67/2833 (2013.01)

(58) Field of Classification Search
CPC ..... H04L 67/2852; H04L 12/66; H04W 84/18
USPC .......................................................... 709/217
See application file for complete search history.

(56) References Cited

U.S. PATENT DOCUMENTS

| 5,936,559 | A | 8/1999 | Howard |
| 6,434,683 | B1 | 8/2002 | West et al. |
| 7,430,331 | B2 | 9/2008 | Singh |
| 7,701,858 | B2 | 4/2010 | Werb et al. |
| 7,830,838 | B2 | 11/2010 | Kohvakka et al. |
| 8,069,451 | B2 | 11/2011 | Shenfield et al. |
| 8,514,760 | B2 | 8/2013 | Mukherjee |
| 8,514,767 | B2 | 8/2013 | Bremner et al. |
| 8,675,659 | B2 * | 3/2014 | McNamee ............ H04L 45/742 370/392 |
| 8,792,402 | B2 | 7/2014 | Werb et al. |
| 9,167,516 | B2 | 10/2015 | Árendás |

(Continued)

FOREIGN PATENT DOCUMENTS

KR 1020090012019 A 2/2009

Primary Examiner — Moustafa M Meky
Assistant Examiner — Elizabeth Kassa
(74) Attorney, Agent, or Firm — L. Jeffrey Kelly

(57) ABSTRACT

A method including receiving a message at a source gateway of the local network, the message includes message data corresponding to a plurality of message elements, assigning a unique group ID based on the type of message received at the source gateway, extracting a message format from the received message, the message format defines how the message data is organized with respect to the message elements, and associating the extracted message format with the unique group ID. The method further including storing, locally, the extracted message format together with the associated unique group ID, establishing a dedicated connection between the source gateway and a target gateway of the remote network based on the unique group ID, encoding the message based on the extracted message format, and sending the encoded message from the source gateway to the target gateway across the dedicated connection.

14 Claims, 10 Drawing Sheets

(56) References Cited

U.S. PATENT DOCUMENTS

| | | | | |
|---|---|---|---|---|
| 9,473,514 | B1* | 10/2016 | Chou | H04W 4/70 |
| 2007/0234369 | A1* | 10/2007 | Paramisivam | G06F 9/546 |
| | | | | 719/313 |
| 2008/0140783 | A1 | 6/2008 | Williams et al. | |
| 2010/0008286 | A1 | 1/2010 | Abedi | |
| 2011/0029622 | A1* | 2/2011 | Walker | G06Q 10/107 |
| | | | | 709/206 |
| 2011/0045851 | A1* | 2/2011 | Maddox | H04W 4/06 |
| | | | | 455/466 |
| 2012/0197898 | A1 | 8/2012 | Pandey et al. | |
| 2013/0094447 | A1 | 4/2013 | Gidlund et al. | |
| 2014/0119377 | A1 | 5/2014 | Crosta et al. | |
| 2014/0204824 | A1* | 7/2014 | Chen | H04W 4/06 |
| | | | | 370/312 |
| 2014/0289249 | A1* | 9/2014 | Davis | G06Q 30/02 |
| | | | | 707/737 |
| 2014/0304662 | A1* | 10/2014 | Yu | G06T 19/20 |
| | | | | 715/849 |
| 2016/0119261 | A1* | 4/2016 | Ghafourifar | H04L 51/066 |
| | | | | 709/206 |
| 2016/0164728 | A1* | 6/2016 | Chakrabarti | H04L 63/029 |
| | | | | 370/254 |
| 2017/0279874 | A1* | 9/2017 | Jolfaei | H04L 67/1002 |
| 2017/0287317 | A1* | 10/2017 | Tavares | G08B 27/001 |

* cited by examiner

DELIVERY OF INCREMENTAL SENSOR DATA OVER OPTIMIZED CHANNEL

BACKGROUND

The present invention relates generally to the field of remote sensing, and more particularly to information processing in a wireless sensor network.

The Internet of Things has become very popular in recent years, and sensor networks, for example, play an important role in the Internet of Things. This has resulted in a very large number of sensors producing overwhelming amounts of data. That data being produced and/or acquired by the sensors in such large quantities has the potential to very easily exhaust network resources. When the network resources become exhausted, the efficiency of data collection and analytics is affected, therefore risking the overall performance of Internet of Things networks.

The traffic pattern of a typical Internet of Things application is very unique. The amount and frequency of data collected from various nodes, for example sensors, is very high; however, the size of each message being sent and received between networks is relatively small. More importantly, a closer look at the messages being sent and received may reveal the data contained in those messages may reflect incremental changes in the data in addition to data without any changes. For example, a sensor acquiring temperature may report little or no change over time.

SUMMARY

According to an embodiment of the present invention, a method is provided. The method may include receiving a message at a source gateway of the local network, the message includes message data corresponding to a plurality of message elements, assigning a unique group ID based on the type of message received at the source gateway, extracting a message format from the received message, the message format defines how the message data is organized with respect to the message elements, and associating the extracted message format with the unique group ID. The method further including storing, locally, the extracted message format together with the associated unique group ID, establishing a dedicated connection between the source gateway and a target gateway of the remote network based on the unique group ID, encoding the message based on the extracted message format, and sending the encoded message from the source gateway to the target gateway across the dedicated connection.

According to another exemplary embodiment of the present invention, a method is provided. The method may include receiving a first message at a source gateway of the local network, the first message comprises message data corresponding to a plurality of message elements, selecting a group ID from a list of predefined group IDs stored locally at the source gateway based on the type of message received, extracting a message format from the received message, the message format defines how the message data is organized with respect to the message elements, and comparing the extracted message format to a locally stored message format associated with the selected group ID. The method further includes updating the locally stored message format to reflect differences between the extracted message format and the locally stored message format, encoding the message based on both the extracted message format and the locally stored message format, wherein old message elements are encoded without encoding new message elements, and sending the encoded message to a target gateway of the remote network across a preexisting dedicated connection between the source gateway and the target gateway.

According to another exemplary embodiment of the present invention, a method is provided. The method may include receiving, by a target gateway of the remote network, a first message from a source gateway of the local network, the first message comprises message data corresponding to a plurality of message elements and is received with a unique group ID assigned based on a message type, wherein the first message is received from the source gateway via a dedicated connection, extracting a message format from the first message, the message format defines how the message data is organized with respect to the message elements, associating the extracted message format with the unique group ID, storing, locally, the extracted message format together with the associated unique group ID, and receiving a second message at the target gateway from the source gateway, the second message being at least partially encoded and having the same group ID as the first message. The method may further include extracting a message format from the second message, comparing the extracted message format of the second message to the locally stored message format associated with the unique group ID, updating the locally stored message format to reflect differences between the extracted message format of the second message and the locally stored message format, and decoding the second message based on the locally stored message format.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
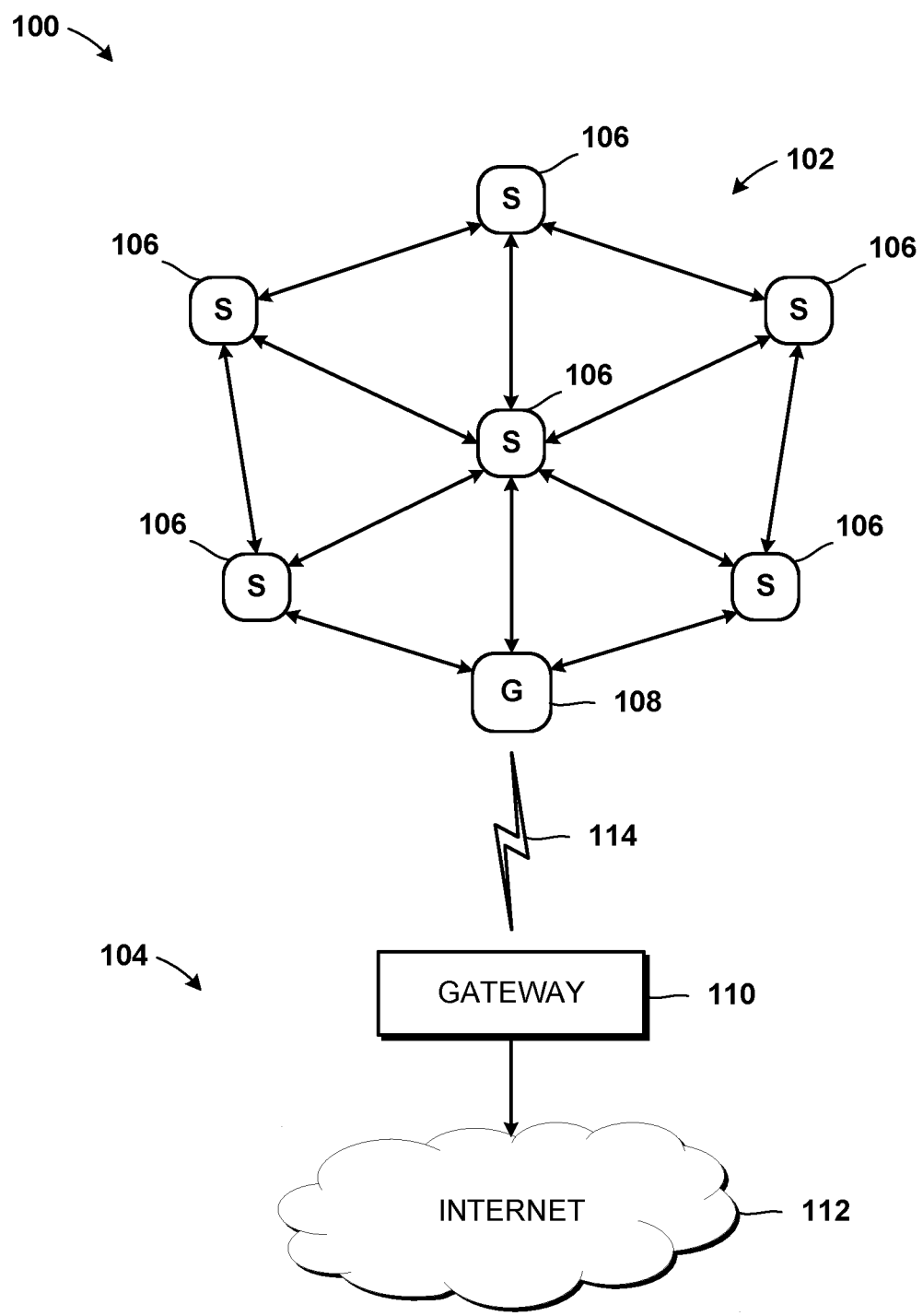
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

In general, remote sensing refers to the acquisition of information of an object or phenomenon, by the use of either recording or real-time sensing device that is either wireless or not in physical or intimate contact with the object. In practice, remote sensing provides for the stand-off collection of data through the use of a variety of devices for gathering information on a given object or area. There are two main types of remote sensing: passive remote sensing and active remote sensing. In passive remote sensing, passive sensors detect natural radiation emitted or reflected by the target object or surrounding area. Active remote sensing, by comparison, utilizes active sensors that emit energy in order to scan objects and areas whereupon the sensors then detect and measure the reflected or backscattered radiation from the target.

A wireless sensor network (WSN) is a physical embodiment of a remote sensing system. A WSN primarily includes a selection of spatially distributed autonomous sensors cooperatively monitoring physical or environmental conditions, such as temperature, sound, vibration, pressure, motion or pollutants. In addition to one or more sensors, each node in a WSN is typically equipped with a radio transceiver or other wireless communications device, a microcontroller, and a power source, usually a battery. Of note, a WSN normally constitutes a wireless ad-hoc network, meaning that each sensor supports a multi-hop routing algorithm where nodes function as forwarders, relaying data packets to a base station.

To the extent that each node in a WSN can act as a transmission relay for other nodes transmitting data to a base station or other aggregation point for collected data, those nodes acting as a transmission relay can access the content of the data routed from acquiring node to aggregation point. Further, different nodes outside of the path of relay for data, but within transmission proximity to nodes in the path of relay can detect the data as the data traverses the path of relay. However, at present no additional processing is performed on data overheard in a proximate node within a path of relay from point of origin to aggregation point. Depending upon the remote sensing application, however, data overheard by nodes outside the path of relay to the aggregation point could provide additional context for relayed data. In this regard, in many cases, data overheard by nodes could be useful in enhancing the meaning of relayed data.

The present invention relates generally to the field of remote sensing, and more particularly to efficient processing of information in a wireless sensor network. One way to efficiently process information in a wireless sensor network is to deliver sensor data in a compact form over an optimized channel. One embodiment by which to deliver sensor data in a compact form over an optimized channel is described in detail below by referring to the accompanying drawings in FIGS. 1 to 9. Those skilled in the art will readily appreciate that the detailed description given herein with respect to these figures is for explanatory purposes as the invention extends beyond these limited embodiments.

Referring now to FIG. 1, a functional block diagram illustrating a system 100 is shown in accordance with an embodiment of the present invention. The system 100 may, for example, include a sensor network 102, such as a wireless sensor network, connected to a remote network 104. The wireless sensor network 102 may include edge nodes 106 (or sensor nodes) connected to an aggregation point 108. The remote network 104 may include a gateway 110 connected to a communications network 112, such as the internet. The sensor network 102 may be designed to support hundreds of devices reporting daily. The system 100 may also be generally understood as any local network (102) in communication with any remote network (104) via an optimized channel 114.

For purposes of the present description the aggregation point 108 of the wireless sensor network 102 may be referred to as a source gateway 108, and the gateway 110 of the remote network 104 may be referred to as a target gateway 110, where, in general, data is sent or communicated from the source to the target. In an embodiment, one or both of the source gateway 108 or the target gateway 110 may be embodied as a gateway computer. In various embodiments, the gateway computer(s) may be, for example, a server computer, a laptop computer, a tablet computer, a netbook computer, a personal computer (PC), a desktop computer, a personal digital assistant (PDA), a smart phone, a mobile device, or any programmable electronic device capable of interfacing two networks that uses different protocols. As described below with reference to FIG. 9, the gateway computer(s), and as such the source gateway 108 and the target gateway 110, may each include internal and external components.

In general, a gateway computer provides data processing and data communications from one network to another network. A gateway computer is a 'gateway' in the sense that it forms a portal through which data is communicated from one network to another network. Moreover, a gateway computer is a 'gateway' in the sense that it is provides a portal between two forms of data communications, for example internal LAN protocols (which are often powerline protocols such as X-10 or wireless LAN protocols such as Bluetooth or 802.11b) and external WAN protocols such as for example TCP/IP or HTTP.

In an embodiment, the system 100 may include any number of gateway computers; however, only one of each is shown for illustrative purposes only. It may be appreciated that FIG. 1 provides only an illustration of one implementation and does not imply any limitations with regard to the environments in which different embodiments may be implemented. Many modifications to the depicted environments may be made based on design and implementation requirements.

Both the sensor network 102 and the remote network 104 may further include wired connections, wireless connections, fiber optic connections, or some combination thereof. In general, both networks 102 and 104 can include any combination of connections and protocols that will support communications between the various nodes, such as, the sensor nodes 106, the source gateway 108, and/or the target gateway 110. The networks 102 and 104 may further include various types of networks, such as, for example, a local area network (LAN), a wide area network (WAN) such as the Internet, a telecommunication network, a wireless network, a mesh network, a public switched network and/or a satellite network.

In general, the source gateway 108, and the target gateway 110 may represent a network node for interfacing with another network that uses a different protocol. The gateways may further include, devices, such as, for example, protocol translators, impedance matching devices, rate convertors, fault isolators, or signal translators. Specifically, in the preferred embodiment, the source gateway 108 and the target gateway 110 connect and translate the network protocol of the wireless sensor network 102 to the network protocol for the internet 112 by performing any required protocol conversions.

The source gateway 108, or base station, may be a specialized node that self-organizes into a sensor network backbone. The source gateway 108 may accumulate data readings from various devices in the sensor network 102, and repeat or route that data to another network. The source gateway 108 may be at the root of the sensor network's 102 network tree. In an embodiment, the sensor network 102 may include multiple aggregation points for redundancy. Specifically, the source gateway 108 may provide an interface to a different physical or logical network. The source gateway 108 may serve as a portal to different types of networks, terminating the sensor network 102 protocol and translating communications to a different protocol appropriate for the new network. Alternatively, the source gateway 108 may act as a bridge, encapsulating sensor network packets in another protocol such as TCP/IP. The source gateway 108 may be configured for networks such as Ethernet, WiFi, cellular, RS232, BACnet, LonWorks, or even simply binary switch outputs. In some configurations, as illustrated, the sensor nodes 106 may connect directly to the source gateway 108, providing a real-time connection to remote devices.

The target gateway 110 may preferably receive network traffic from, for example, local networks and repeat or reroute that network traffic to, for example, the internet 112. Alternatively, the target gateway 110 may accumulate network traffic from the internet 112 and repeat or route that network traffic back to, for example, the sensor network 102. Like the source gateway 108, the target gateway 110 may serve as a portal to different types of networks, terminating the internet 112 protocol and translating communications to a different protocol appropriate for the new network. It should be noted that the target gateway 110 is only an example of one gateway of the remote network 104, which may generally include a plurality of gateways suitable for a plurality of functions. Also, the target gateway 110 may be configured for networks such as Ethernet, WiFi, cellular, RS232, BACnet, LonWorks, or even simply binary switch outputs.

In some embodiments, the sensor network 102 may further include a host which may operate on a computer running Windows, Linux, or another environment suitable for the particular application. The host may include host software, which may provide an interface to the sensor network 102, direct data into a database, or offer GUI applications that may present data, allow actuation (if applicable), or support network administration. In one embodiment, the host may operate on a handheld device. In such an embodiment, the handheld device may support a walk-by scenario, wherein a handheld device may communicate with the source gateway 108 to extract the network's data.

In the preferred embodiment, the sensor nodes 106, or alternatively edge nodes, may include small, battery-powered wireless radio transceivers that may provide low-bandwidth wireless connectivity for attached devices such as sensors (for example, temperature, humidity, power or fuel consumption) and actuators (for example, fans, LEDs, switches). Within the mesh or hierarchical structure of the sensor network 102, the sensor nodes 106 may have parent nodes through which the sensor nodes 106 may send or receive data. A sensor node's parent may include, for example, a router, a data accumulator, or a gateway. The sensor nodes 106 may report data periodically, such as once a day, and may sleep for extended periods of time to reduce battery consumption. For example, sensor nodes 106 typically do not serve as parents, but only as children.

Embodiments of the present invention are directed to delivering sensor data, generated by the sensor network 102, from the source gateway 108 to the target gateway 110 in a compact form over the optimized channel 114. In general, and for purposes of this description, the sensor data is sent and received between the source gateway 108 and the target gateway 110 in the form of a message.

Messages sent from the source gateway 108 to the target gateway 110 may be of a particular type and have a particular format. Message type may refer to a generally characterization of the data being communicated by particular message. For example, the message type may indicate messages containing sensor data from a wireless sensor network or messages containing personal contact information from corporate directory. The message format defines, generally, how the message data is organized. Specifically, the message format may refer to the physical data format or data structure of the message. For example, characters, lines, spacing, tags, etcetera.

The message type, and the message format, may be automatically defined by the sensor network 102 or the source gateway 108. In an alternative embodiment, the message type and message format may be pre-defined by a program or a user. For example, when authoring the client and server programs which operate on the sensor network 108, programmers, and/or users may specify a particular message type and particular message format to be used for each message. In some cases, a reference indicating the message type may be included or embedded within the context of the message. In all cases, the message format is unique to each message type, and different message types will likely have different message formats. In general, three scenarios may exist: (1) the message type is known to both the sender and the recipient, and (2) the message type is unknown to both the sender and the recipient; however, combinations of the above two scenarios are contemplated. For example, one likely combination may be instances where the message type is only known to the sender and would be unknown to the target.

Figure 2:
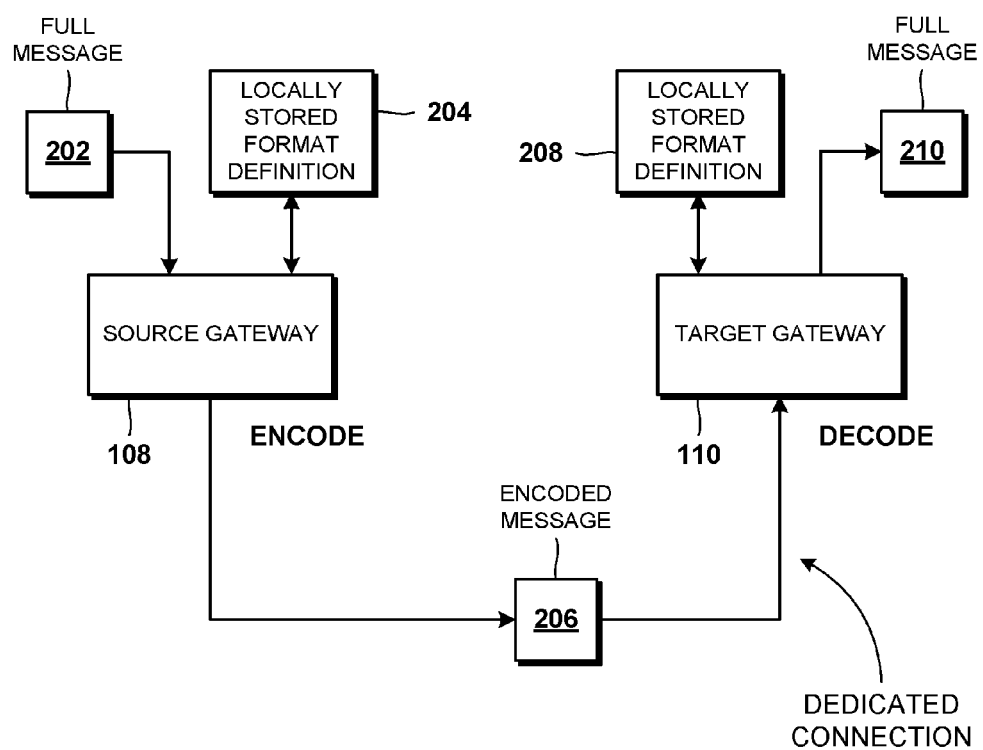
FIG. 2 is a functional block diagram illustrating the delivery of sensor data in a compact form over an optimized channel, in accordance with an embodiment of the present invention.

Referring now to FIG. 2, delivery of sensor data, generated by the sensor network 102, from the source gateway 108 to the target gateway 110 in a compact form over an optimized channel is shown according to the first scenario. In the present embodiment, the message type may be known to both the source gateway 108 and the target gateway 110. In such cases, a reference, or group ID, may be embedded in each message sent from the source gateway 108 and that group ID is recognized by the target gateway 110 upon receipt. The group ID, may be predefined or specified by the client program in advance of being received at the source gateway 108, or assigned by the source gateway 108 based on the message type. In all cases, the group ID is unique to each message type, and different message types will be assigned or associated with different group IDs.

In particular, the group ID may be assigned based on the type of the message received at the source gateway 108. In general, the group ID may indicate or identify the type of message, for example, the group ID may be based on any message characteristic which may be used to distinguish two messages from one another. In the present embodiment, for example, the group ID indicates the type of sensor data, such as, for example, position, location, temperature, humidity, heart rate, gas (oxygen), chemical, (oil), or any differentiating characteristic of the sensor data. For example, all sensor data indication a location would have a common group ID, or all sensor data including temperature data would have a common group ID.

According to an embodiment of the first scenario, the source gateway 108 may receive an incoming message 202 in its full version and, after recognizing its group ID, encode the full version of the incoming message 202 based on that group ID. More specifically, a particular incoming message may be encoded at, or by, the source gateway 108 based on a locally stored format definition 204 associated with the known group ID. The locally stored format definition 204 may include, a particular message format associated with a unique group ID. Multiple format definitions may be stored locally at the source gateway 108 allowing the source gateway 108 to encode multiple different types of messages having different formats. In the present embodiment, the locally stored format definition 204 is predetermined and may be considered a prerequisite to the source gateway 108 knowing or recognizing the group ID.

In an embodiment, the incoming message 202 may include message data corresponding to a plurality of message elements or data fields, such as, for example, Name, Address, and Gender. The incoming message 202 may contain predefined tags for each respective message element. In general, each message element may include a single data value. For purposes of the present example only, the message elements are assumed to be empty and the exemplary message below is shown with predefined tags without any message data. Further, the exemplary incoming message below is not limited to the message elements of the present example. Exemplary tags are shown in Table 1.

TABLE 1

| Incoming message |
|---|
| <People/> |
| <Name/> |
| <Address/> |
| <Gender/> |
| </People> |

In an embodiment, the incoming message 202, and as such the data fields of Table 1, may be encoded by assigning a unique code or number to each entry or message element tag. In doing so, the message element tags associated with each message element may be replaced with the unique codes, for example, different numeric values. For example, the first tag "People" may be replaced with the number 1, and the tags "Name," "Address," and "Gender," may be replaced with the numbers 1.1, 1.2, and 1.3, respectively. The unique codes assigned during encoding may alternatively each be referred to as a unique mapping ID which may be used to map the associated data with the appropriate tag during decoding. After the incoming message 202 is encoded by the source gateway 108 it may become an encoded message 206.

In the present example, the data fields "Name," "Address," and "Gender," are interpreted to be sub-categories of a broader data field category "People," and as such, are assigned hierarchical list of values (1.1, 1.2, and 1.3) associate with the broader category. The incoming message 202 may include tags for multiple categories of data, each having tags associated with one or more sub-categories. Encoding will convert both the category tags and the sub category tags into numeric values as illustrated below. The encoded message 206 is illustrated in Table 2.

TABLE 2

| Encoded Incoming Message |
|---|
| 1 |
| 1.1 |
| 1.2 |
| 1.3 |
| 1 |

After the incoming message has been encoded, the original tags it was received with are removed, and the encoded message 206 will only contain the new unique codes. It should be noted that if a particular tag in the incoming message has no value, then the corresponding unique code may be omitted from the encoded message 206 as is described below with respect to an example.

In some embodiments, the original tags would remain in a reference message which may be generated for each unique group ID, and as such, for each unique message format. The reference message may be saved by one or both of the source gateway 108 and the target gateway 110.

The encoded message 206 is then sent or transmitted to the target gateway 110 across an optimized channel or otherwise referred to as a dedicated connection. The dedicated connection is specific to and established only for the delivery of a messages of that specific format having that particular group ID. Stated differently, messages with different message types, and as such different group IDs, would be transmitted or across different dedicated connections established between the source gateway 108 and the target gateway 110. Each dedicated connection may alternatively be referred to as a persistent websocket connection. Preferably, the dedicated connection is established when the source gateway 108 identifies the message type of a particular incoming message. Because of the dedicated connection, the target gateway 110 knows that all messages received via that particular dedicated connection are of a particular message type and therefore have a particular message format. Each source gateway and target gateway pair may preferably include multiple dedicated connections, each established for a communicating a single message type. It should be noted that while only a dedicated connection is shown in FIG. 2, a typical HTTP/MQTT connection may also exist between the source gateway 108 and the target gateway 110.

The dedicated connection is used to transmit the encoded sensor data of particular message group ID. For example, heart rate data, once recognized as a pattern, will be sent over a dedicated connection, and temperature data might be transmitted over another dedicated connection.

The dedicated connection could be established by either source gateway 108 or target gateway 110. Once a particular group ID is recognized (predefined or automatically recognized), the source gateway 108 will establish the dedicate connection with target gateway 110. In an embodiment, the first message exchanged across the dedicated connection may be a general description of which message group ID/message type will be sent over that dedicated connection. This allows both the source gateway and the target gateway to store a mapping of the dedicated connection and the types of message to be sent and received across that dedicated connection. With this mapping, the target gateway knows whatever message received from a particular dedicated connection belongs to particular message type (e.g. message coming from port 12345 belongs to message group ID 123).

The dedicated connection is optimized because not only are the messages encoded, the content itself might be further compressed and batch encrypted for better performance, as is described in more detail below with reference to FIG. 4. Because of the dedicated connection and the associated mapping, the target gateway will have all the information to restore an encoded message or batch encrypted message to its full version.

The target gateway 110 then decodes the encoded message 206 received across the dedicated connection from the source gateway 108. The target gateway 110 decodes the encoded message 206, and restores it back to its full version 210, based on a locally stored format definition 208 associated with that particular group ID. It should be noted that each message type will have a different message format which is associated with a different group ID. In other words, messages of a similar type will generally have a similar format and be associated with the same group ID.

The encoded message 206 is decoded by re-applying the original tags to the data fields based on the unique codes assigned during the encoding process. In order to decode, the target gateway 110 first recognizes the group ID of the encoded message and then looks up the locally stored format definition 208 associated with and corresponding to that particular group ID. In such cases, the group IDs and associated message formats are predefined and stored locally in, for example, a list at both the source gateway 108 and the target gateway 110. It is the associated message format saved locally which dictates the template from which the incoming message may be decoded.

Specifically, decoding includes replacing the unique codes with the original tags. For example, the first unique code of 1 will be replaced with the original tags "People," and the codes 1.1, 1.2, and 1.3 may be replaced with the original tags "Name," "Address," and "Gender," respectively.

Figure 3:
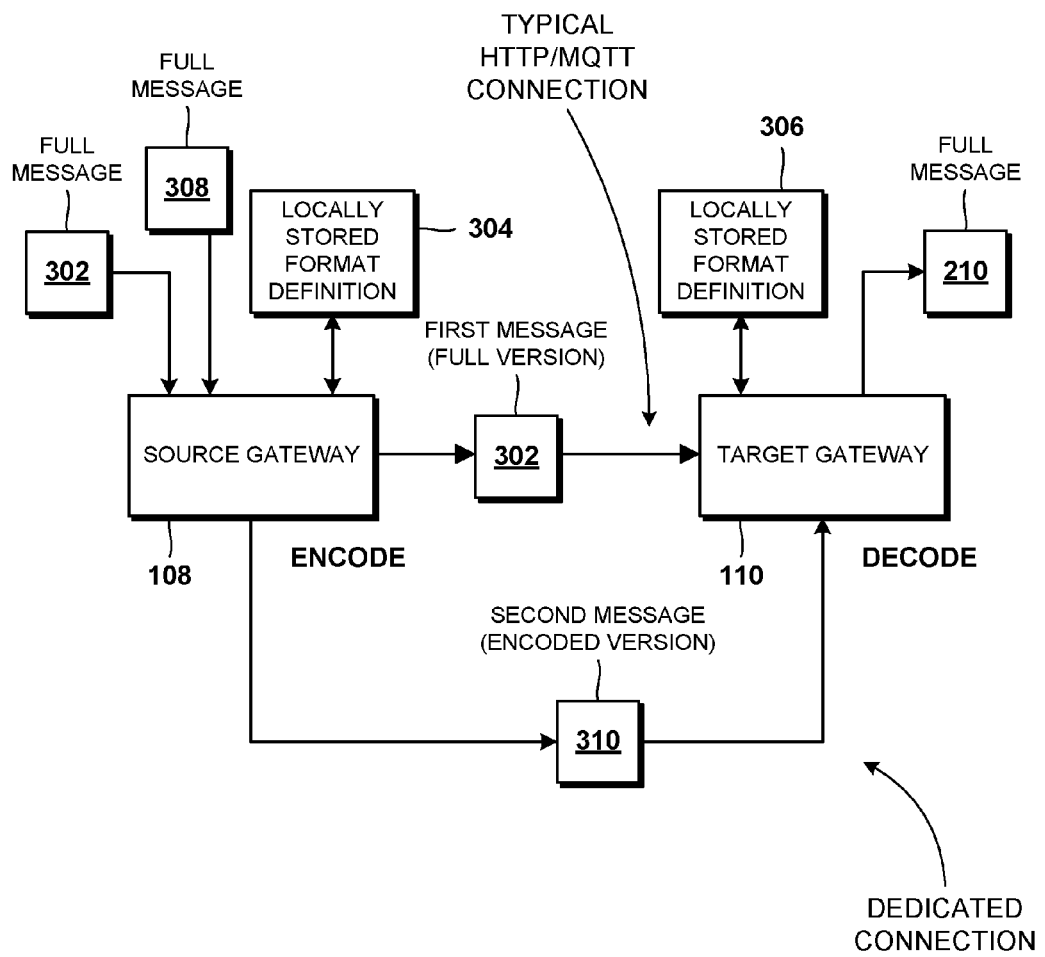
FIG. 3 is a functional block diagram illustrating the delivery of sensor data in a compact form over an optimized channel, in accordance with an embodiment of the present invention.

Referring now to FIG. 3, delivery of sensor data, generated by the sensor network 102, from the source gateway 108 to the target gateway 110 in a compact form over an optimized channel is shown according to the second scenario. In the present embodiment, the message type may be unknown to both the source gateway 108 and the target gateway 110. As described above, the message type may typically be predefined, for example, by the sensor network 102, and as such the group ID may be predefined and embedded within the incoming message. Alternatively, the group ID is assigned by the source gateway 108 based on the message type. As described above, the group ID is unique to each message type, and different message types will be assigned or associated with different unique group IDs.

In an embodiment, the program logic will define the message type, and as such the message format, while a programmer specifies the group ID using an application programming interface. In another embodiment, the source gateway 108 automatically learns the message type and message format, groups incoming messages based on their type, and assigns a group ID accordingly.

When the source gateway 108 receives a first incoming message 302, in its full version, with a new or unknown message type and/or group ID, it will not encode the message and instead send the full version of the first message 302 to the target gateway 110. In such cases, the full version of the first message 302 is sent from the source gateway 108 to the target gateway 110 over a typical HTTP/MQTT connection. Before sending the first message 302, the source gateway 108 will save locally the message type, message format, and group ID as a format definition 304. As previously mentioned, if the first message 302 is received without a group ID, the source gateway 108 will save locally the message type and message format, and assign a unique group ID to the saved message type and format.

In the present example, the group ID is also unknown to the target gateway 110, the first message 302 is not encoded by the source gateway 108 because the target gateway 108 would be unable to decode the message. In doing so, the source gateway 108 may append a tag to the first message 302. The appended tag will indicate to the target gateway 110 a status of the first message 302, for example, that the message is "new" or "unknown" and is not encoded. Alternatively, receipt of the first message 302 with an unknown group ID would also indicate to the target gateway 110 the "new" status of the message.

When the target gateway 110 receives the first message 302 from the source gateway 110 with a new or unknown group ID, it will extract the message type, and more importantly the message format, from the full version of the first message 302. The target gateway 110 will save the extracted message format locally as a format definition 306. In doing so, the target gateway 110 also associates the group ID of the first message 302 together with the saved message format. Now, the target gateway 110 is capable of receiving encoded messages with that particular group ID.

When the source gateway 108 receives another incoming message, a second message 308 with the same group ID as the first message 302, it will examine the message structure to check if there are new elements not shown in previous messages having the same group ID. For purposes of the present example, the second message 308 is of the same message type as the first message 302 such that both the first message 302 and the second message 308 have identical message formats and identical message elements. As stated previously, each message element may include a single data value.

If no new elements are found, the source gateway 108 will encode the entire second message 308 and send an encoded second message 310 to the target gateway 110, as described above, based on the locally stored format definition.

Alternatively, messages with known group IDs received by the source gateway 108 may not be encoded in their entirety. For example, if the source gateway 108 does detect new elements, it will partially encode the second message 308 and send the partially encoded message (310) to the target gateway 110, as described above. In such cases, the source gateway 108 may encode only old elements and send any new elements without being encoded.

When the target gateway 110 receives the encoded second message 310 with the known group ID from the source gateway 110, it will decode the entire message based on that group ID and based on the locally stored format definition, as described above.

Moreover, when the target gateway 110 receives a partially encoded second message 310 from the source gateway 108 with the same group ID as the first message, it first examines the message for new elements or new data fields. The encoded message 310 will only contain new elements if the message was delivered to the source gateway 108 with the new elements. It should be noted that the target gateway 110 may, as a matter of course, always scan incoming messages for new elements regardless of whether the message is fully encoded or partially encoded.

The incoming message may, in some instances, be received by the target gateway 110 with a tag, as described previously, indicating whether or not the entire message is encoded. When a new element is identified by a tag or detected by the target gateway 110 during a scan, the target gateway 110 updates the locally stored format definition associated with that particular group ID to include the new element. Therefore, that particular element can be encoded in future messages sent between the source gateway 108 and the target gateway 110.

EXAMPLE

Below is an example of multiple successive messages received by the source gateway 108 and sent to the target gateway 110. All messages of the present example have the same group ID. Like above, incoming messages may include elements or data fields, such as, for example, Name, Address, and Gender. The incoming messages may contain predefined tags for each respective data field. For purposes of the present example only, the data fields each contain message data associated with each data field, respectively. Further, the exemplary incoming messages below are not limited to the data fields of the present example.

An exemplary version of a first message received by the source gateway 108 and prior to encoding is illustrated in Table 3 below. In the present example, the first line may always include the group ID.

TABLE 3

First Message prior to Encoding

<group ID="111">
<People>
  <Name/="Jennifer">
  <Address/="459 Main Street">
  <Gender/="Female">
</People>

Upon receipt of the first message, the source gateway 108 recognized the group ID and, assuming no new elements exist, will encode the entire first message and send it to the target gateway 110. An exemplary version of the first message after being encoded by the source gateway 108 is illustrated in Table 4 below.

TABLE 4

First Message after encoding 111
1
  1.1= Jennifer
  1.2=459 Main Street
  1.3= Female
1

The first message is then received by the target gateway 110 and decoded according to the locally stored message format associate with the known group ID, as described previously.

Subsequently, the source gateway 108 may receive a second message, this time containing a new element. When the source gateway 108 receives the second message and recognizes the group ID, it scans the message for new elements. In the present example, the source gateway 108 will identify "telephone" as a new element. The new element tag is a sub-category of the broader category "People." An exemplary version of a second message received by the source gateway 108 prior to encoding is illustrated in Table 5 below.

TABLE 5

Second message prior to Encoding

<group ID="111">
<People>
  <Name/="Jennifer">
  <Address/="459 Main Street">
  <Gender/="Female">
  <Telephone/"555-555-5555">
</People>

Because a new element exists, the source gateway 108 will only partially encode the second message. Specifically, only the old elements "Name," "Address," and "Gender" will be encoded, and the new element "telephone" will be sent in its full version tag and all. An exemplary version of the second message after being partially encoded by the source gateway 108 is illustrated in Table 6 below.

TABLE 6

Second message after partial encoding 111
1
  1.1= Jennifer

TABLE 6-continued

Second message after partial encoding

| |
|---|
| 1.2=459 Main Street |
| 1.3= Female |
| <Tel/"555-555-5555"> <1.4> |
| 1 |

When the target gateway 118 receives the partially encoded second message of Table 6 and recognizes the group ID, it too will scan the message for new elements. One way the target gateway 110 may identify new elements is by decoding all encoded elements according to the locally stored message format, and if any remain they must, by process of elimination, be new. Alternatively, the target gateway 110 may compare the partially encoded second message to the locally stored message format of the same group ID to determine the existence of new elements.

It should be noted that the partially encoded message will also include a unique mapping ID (1.4) associated with the new element to be used for encoding and decoding the new element in future messages.

In the present example, the target gateway 118 will discover "telephone" is a new element based on its unencoded format. Alternatively, the second message may be received with a tag indicating to the target gateway 108 that it was only partially encoded. Upon discovery or notification of the new element, the target gateway 110 will update the locally stored message format to reflect the differences identified by comparing the extracted message format to the locally stored message format.

EXAMPLE

Below is another example of multiple successive messages received by the source gateway 108 and sent to the target gateway 110. In the present example, only "new data" is communicated from the source gateway 108 to the target gateway 110. Stated differently, only those message elements having an updated value will be encoded and sent from the source gateway 108 to the target gateway 110 over the dedicated connection. Such messages may be referred to as an incomplete message because not all message elements/data are encoded and communicated over the dedicated connection.

In the present example, the data being sent over the dedicated connection is the heartrate of an individual. For example, a heartrate sensor continuously sends heartrate data to the source gateway 108 every 5 seconds. As such, the source gateway 108 would then encode and send only changes in the heartrate to eliminate unnecessary communication thereby eliminating the delivery of redundant information. Doing so improves efficiency of the communication of sensor data between the source and the target.

An exemplary version of a first heartrate message received by the source gateway 108 prior to encoding is illustrated in Table 7 below. Like in previous examples, the first line includes the group ID. Also, for purposes of this example the "Time" value represents relative time elapsed between heartbeat measurements; however, an absolute time value may also be used. Unlike previous examples, the below message may only include one category of data thus obviating the need for tags to distinguish between categories and sub-categories.

TABLE 7

First Heartrate Message prior to Encoding

| |
|---|
| <group ID="9999"> |
| <username="Jeffrey"> |
| <heartrate="80"> |
| <time="0"> |

Upon receipt of the first heartrate message, the source gateway 108 will recognize the group ID (9999) and will encode the entire first heartrate message and send it to the target gateway 110. An exemplary version of the first heartrate message after being encoded by the source gateway 108 is illustrated in Table 8 below.

TABLE 8

First Message after encoding

| |
|---|
| 9999 |
| 2.1=Jeffrey |
| 2.2=80 |
| 2.3=0 |

Alternatively, the first heartrate message may be written as [9999:2.1=Jeffrey; 2.2=80; 2.3=0]. The first heartrate message is then received by the target gateway 110 and decoded according to the locally stored message format associated with the known group ID (9999), as described previously.

Subsequent heartrate messages are received by the source gateway 108 every 5 seconds. For example, if the next 10 heartrate values received over the next 50 minutes are 81, 79, 77, 76, 75, 60, 60, 60, 60, 68, then the corresponding messages sent to the target gateway 110 are as illustrated in table 9 below.

TABLE 9

Subsequent heartrate messages

| |
|---|
| 1. [9999: 2.2 = 81; 2.3 = 5] |
| 2. [9999: 2.2 = 79; 2.3 = 10] |
| 3. [9999: 2.2 = 77; 2.3 = 15] |
| 4. [9999: 2.2 = 76; 2.3 = 20] |
| 5. [9999: 2.2 = 75; 2.3 = 25] |
| 6. [9999: 2.2 = 60; 2.3 = 30] |
| 7. [9999: 2.3 = 35] |
| 8. [9999: 2.3 = 40] |
| 9. [9999: 2.3 = 45] |
| 10. [9999: 2.2 = 68; 2.3 = 50] |

Most notably, each of the subsequent heartrate messages encoded and sent by the source gateway 108 only include data that is new or changed. More specifically, the username is never communicated in any of the 10 subsequent messages because the heartrate of a single individual was being measured. Also, messages 7-9 only include data indicating the relative time because, in those messages, the heartrate did not change and the relative timestamp is the only element that changed. Accurate and efficient message delivery between the source gateways 108 and the target gateway 110 are made possible, in part, due to the encoding/decoding process and the dedicated connection, in addition to the selective delivery of only new/unchanged message elements.

In order to accomplish efficient message delivery as described above, the source gateway 108 may keep a cache of the latest data values of previous sent messages, at least the data values of the very last message received. The source gateway 108 may use the cache to determine what, if any, data elements change in successive messages. In some cases, the latest value cache would be included in the locally stored format definition.

Furthermore, the target gateway 110 may also keep a cache of the latest data values of previously received messages. This will allow the target gateway 110 to decode and restore the complete message after it receives a partially encoded message having incremental updates. Specifically, the target gateway 110 will restore an incoming message to its full version from the data values locally stored in the cache.

Figure 4:
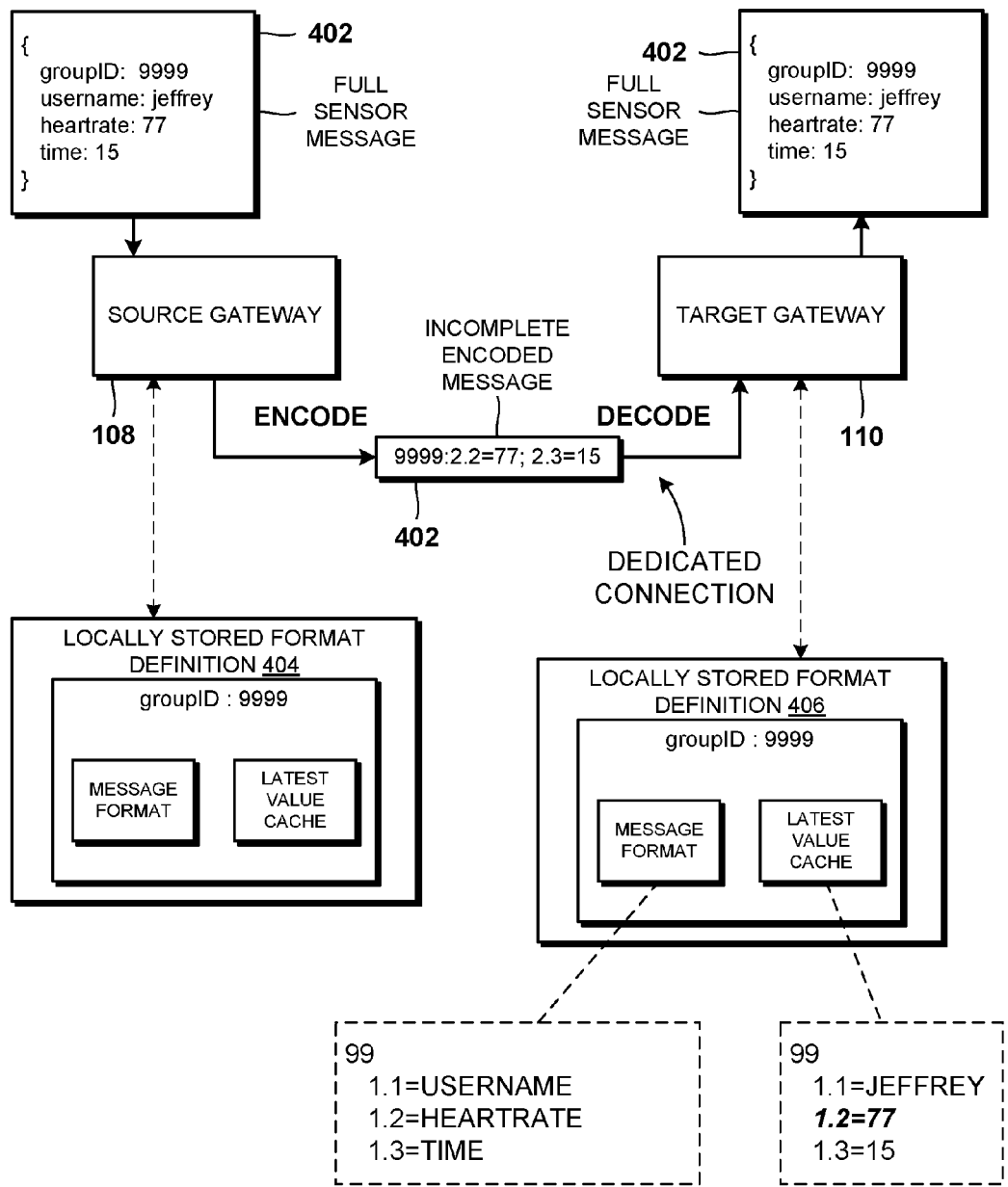
FIG. 4 is a functional block diagram illustrating decoding and restoration of an incomplete message, in accordance with an embodiment of the present invention.

Referring now to FIG. 4, an example of the decoding and restoration of an incomplete heartrate message is shown. For example, a demonstration of encoding and decoding of the third heartrate message 402 of the previous example is provided. In the present example, only the heartrate and the time are encoded and communicated from the source gateway 108 to the target gateway 110 via the dedicated connection. Only the heartrate and the time are encoded and communicated because they are the only data values that changed from the second heartrate message to the third heartrate message. In order for the encoding/decoding techniques to be applied the group ID will always be communicated. It should be noted that for purposes of the present example only, the same reference numeral is used to identify the third heartrate message at all points in time.

Specifically, the third heartrate message 402 is received by the source gateway 108 and is compared to a locally stored format definition 404. First, the source gateway 108 must recognize the group ID and compare the incoming message to the format definition 404 associated with that group ID, 9999 in the present example. Next, the source gateway 108 compares the data values of the third heartrate message 402 to the data values locally stored in a cache of the previous message with the same group ID. Based on that comparison the source gateway 108 determines the "username" value is unchanged, the "heartrate" value changed from 79 to 77, and that the time value changed from 10 to 15. Therefore, the encoded message sent by the source gateway 108 includes only the group ID, the new heartrate value and the new time value, as illustrated.

Upon receipt of the incomplete encoded message the target gateway 110 will decode and restore the full version of the message using a locally stored format definition 406 including a locally stored message format and the locally stored latest value cache. In one example, the incomplete encoded message of [9999:2.2=77; 2.3=15] may first be restored to a complete encoded message of [9999:2.1=jeffrey; 2.2=77; 2.3=15], by adding the unchanged values from the latest value cache. Then, the complete encoded message may be decoded based on the locally stored message format.

In sum, embodiments of the present invention provide for optimized stream delivery of sensor data by sending data between a source and a target in a compact form. Once the message format is identified, either explicitly specified or automatically identified by the gateways, the source gateway can then send messages in a compact form. Additionally, efficiency of the sensor data delivery between the source and the target may be improved by sending only incremental changes.

Moreover, embodiments of the present invention provide for optimized stream delivery of sensor data by establishing an optimized dedicated connection between the source gateway and the target gateway to deliver message data of a particular message type associated with a unique group ID.

In an embodiment according to a combination of the above scenarios, the message type may be known only to the source gateway 108, and thus would be new or unknown to the target gateway 110. As such the group ID will also be known to the source gateway 108. Format definitions and associated group IDs locally stored at the source gateway 108 may be predefined, for example, either by the sensor network, program logic, a programmer, or some combination thereof. In such cases, the source gateway 108 will encode an incoming message according to a locally stored format definition associated with the know group ID.

In the present scenario, any one particular message must first be communicated to the target gateway 110 in its full version to allow the target gateway to extract and save a format definition locally, as described in detail above. Once the format definition and associated group ID is stored locally at the target gateway 118, subsequent messages of the same group ID may be encoded and sent as incomplete messages, as described in detail above.

Figure 5:
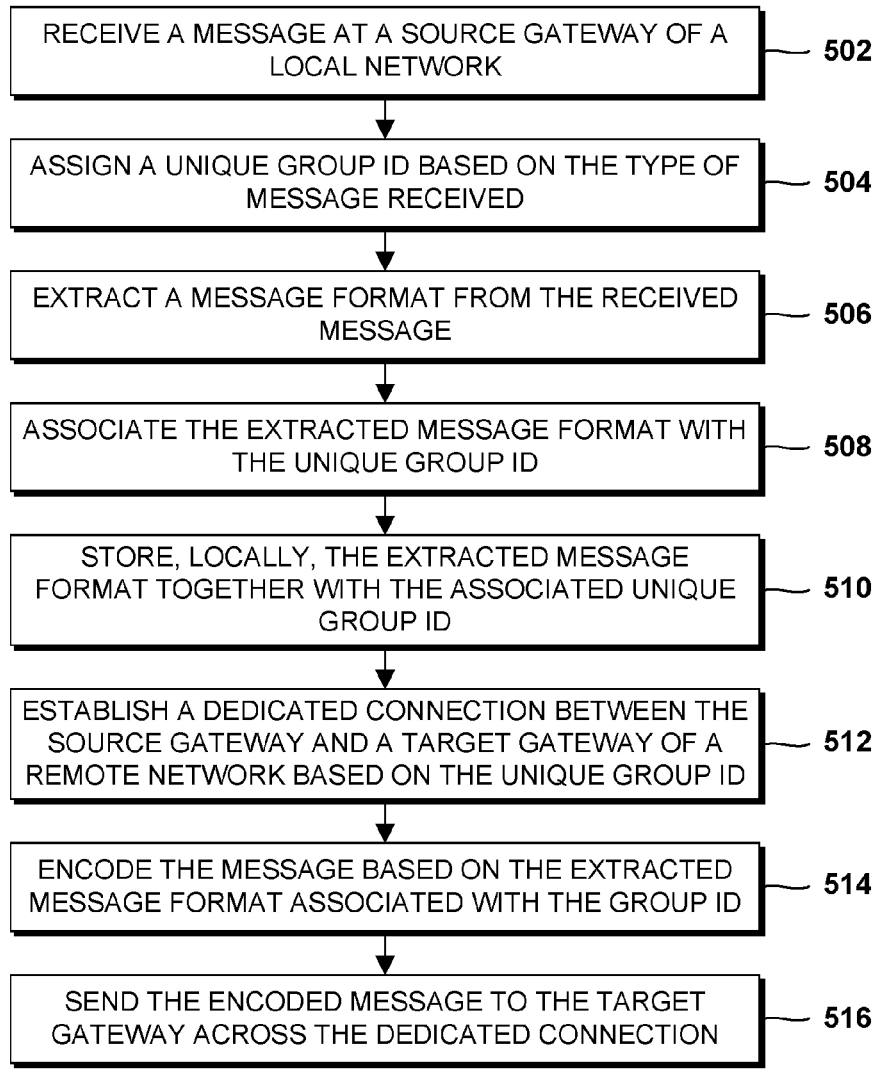
FIG. 5 is a flowchart depicting operational steps of a source gateway when it receives a new message having an unknown group ID, in accordance with an embodiment of the present invention.

Referring now to FIG. 5, a flowchart depicting the operational steps of the source gateway 108 when it receives a new message having an unknown group ID, is shown according to an embodiment of the present invention. For purposes of the present description an incoming message is said to have an unknown group ID when the source gateway 108 has not yet received a message of its particular type.

The source gateway 108 receives an incoming message from the sensor network 102 on a periodic basis (at 502). Each message sent by the source gateway 108 and received by the target gateway 110 is of a particular type and is associated with a unique group ID. The source gateway 108 assigns a unique group ID to the incoming message (at 504). In some embodiments, a group ID may be predetermined or specified by a programmer in advance of the message being received by the source gateway 108. Next, the source gateway 108 extracts a message format of the incoming message (at 506). Stated differently, the source gateway 108 reads or scans the incoming message and detects and saves locally the format of the incoming message. Specifically, the message format may include organization of data within the message, data labels, data values, character count, number of lines, spacing and/or other formatting characteristics which may be used by the source gateway 108 to distinguish one format from another.

Once the source gateway 108 extracts the message format, it associates the extracted message format with the unique group ID (at 508). The source gateway 108 then stored locally the extracted message format together with the associated unique group ID (at 510). The extracted message format and associated unique group ID may together be referred to as a format definition. Next, the source gateway 108 establishes a dedicated connection between it and the target gateway 110 (at 512). The dedicated connection is based on and specific to each unique group ID. Before the incoming message can be transmitted to the target gateway 110, it is encoded by the source gateway 108 (at 514). The incoming message is encoded based on the extracted message format associated with the group ID. Finally, the encoded message is sent from the source gateway 108 to the target gateway 110 across the dedicated connection (at 516).

Figure 6:
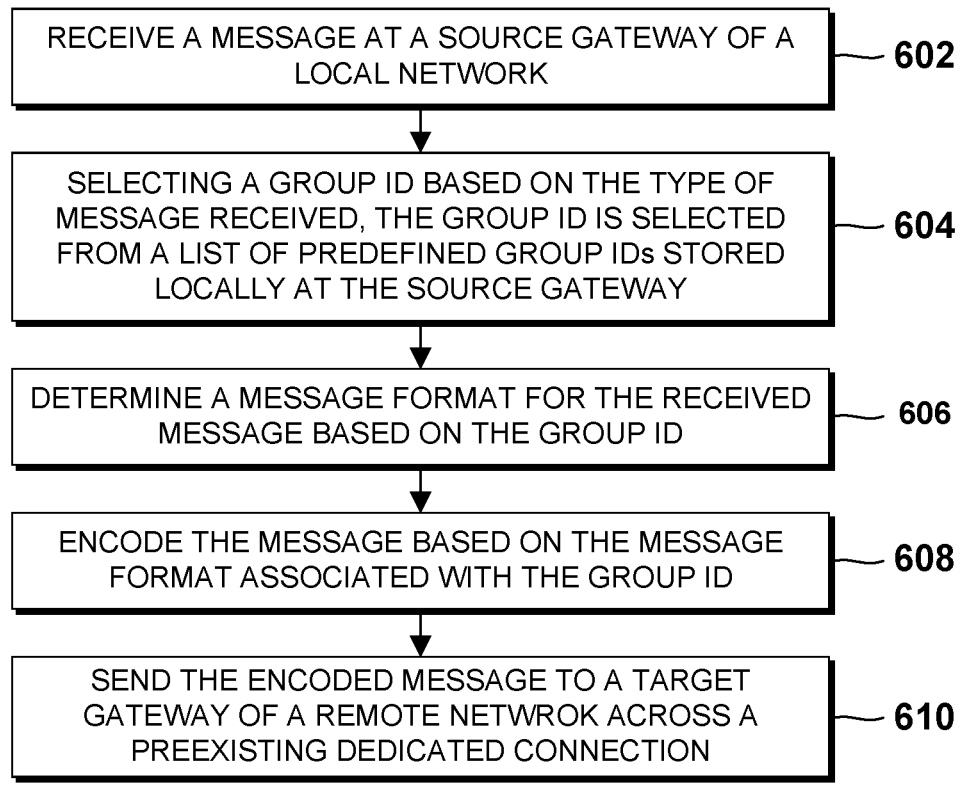
FIG. 6 is a flowchart depicting operational steps of a source gateway when it receives a message having a known group ID, in accordance with an embodiment of the present invention.

Referring now to FIG. 6, a flowchart depicting the operational steps of the source gateway 108 when it receives a message having a known group ID is shown according to an embodiment of the present invention. For purposes of the present description an incoming message is said to have a known group ID when the source gateway 108 has already received a message of its particular type or, alternatively, the message type and thus group ID is predefined and stored locally at the source gateway 108.

Like above, the source gateway 108 receives an incoming message from the sensor network 102 on a periodic basis (at 602). In some embodiments, the source gateway 108 will detect and recognize the type of the received message and match it to a known group ID. In the present example, the source gateway 108 will recognize the message type of the incoming message and select a locally stored group ID previously associated with messages of a similar type (at 604). Specifically, the source gateway 108 will select a group ID based on the type of message received. The group ID is selected from a list of predefined group IDs stored locally stored at the source gateway 108.

Next, the source gateway 108 determines or identifies, from a locally stored format definition, the message format based on the selected group ID (at 606). After, identifying the message format, the source gateway 108 encodes the incoming message based on the predefined message format associated with the particular group ID (at 608). It should be noted that updating the locally stored message format may include adding message elements, subtracting message elements, or both. Lastly, the encoded message is sent from the source gateway 108 to the target gateway 110 across the dedicated connection (at 610).

Figure 7:
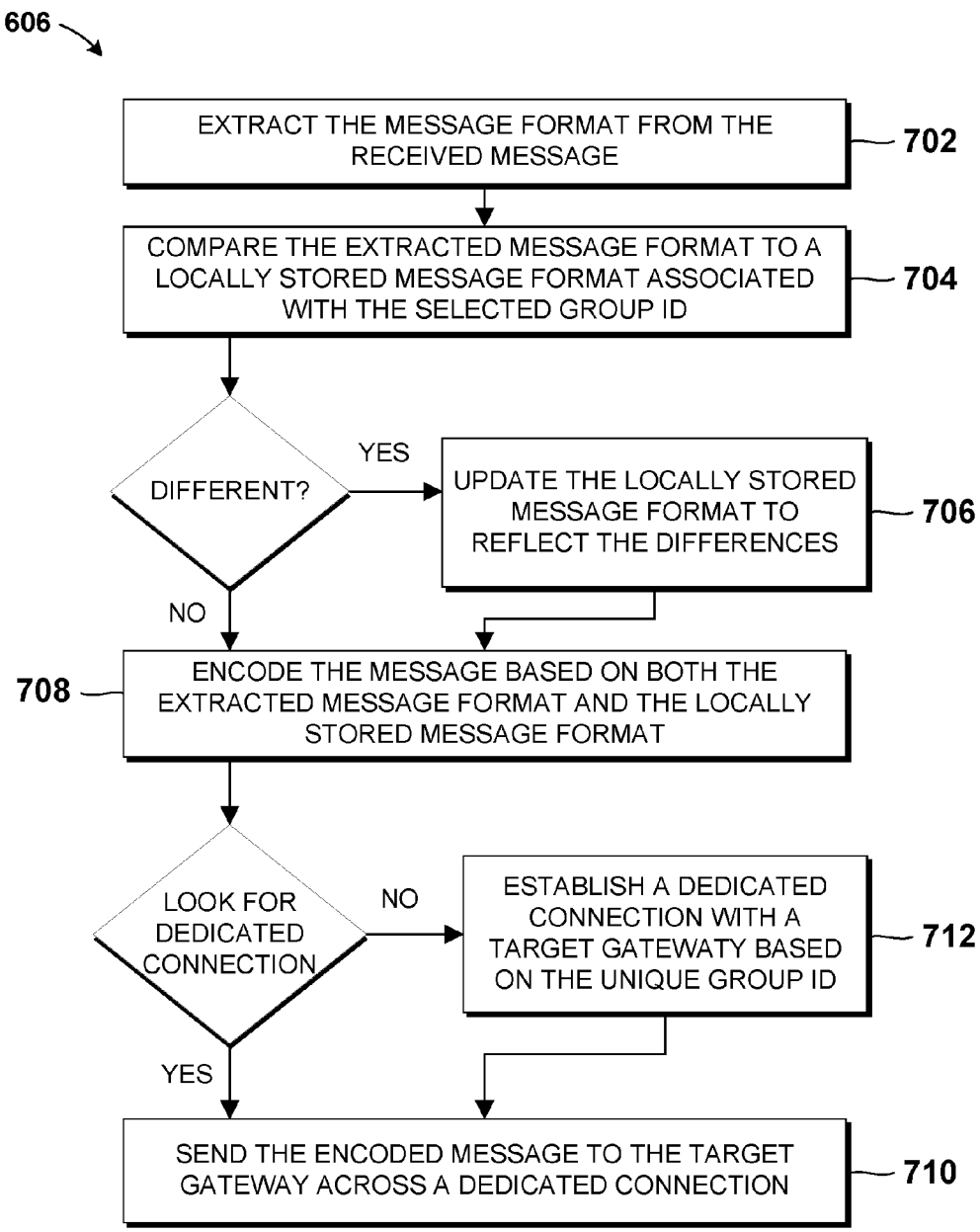
FIG. 7 is a flowchart depicting operational steps of a source gateway when it determines the message format for the incoming message based on the group ID, in accordance with an embodiment of the present invention.

Referring now to FIG. 7, a flowchart depicting the operational steps of the source gateway 108 when it determines the message format for the incoming message based on the group ID is shown according to an embodiment of the present invention. First, the source gateway 108 extracts the message format from the incoming message (at 702), and then compares the extracted message format to a locally stored message format associated with the unique group ID (at 704).

If the extracted message format is different from the locally stored message format, then the source gateway 108 updates the locally stored message format to reflect the differences (at 706). If the extracted message format is not different from the locally stored message format, then the source gateway 108 encodes the incoming message based on both the extracted message format and the locally stored message format (at 708).

The source gateway 108 then sends the encoded message to the target gateway 110 across a dedicated connection (at 710). If, however, a dedicated connection does not yet exist for messages of that particular group ID, then the source gateway 108 will establish a dedicated connection with the target gateway 110 based on the unique group ID (at 712).

Figure 8A:
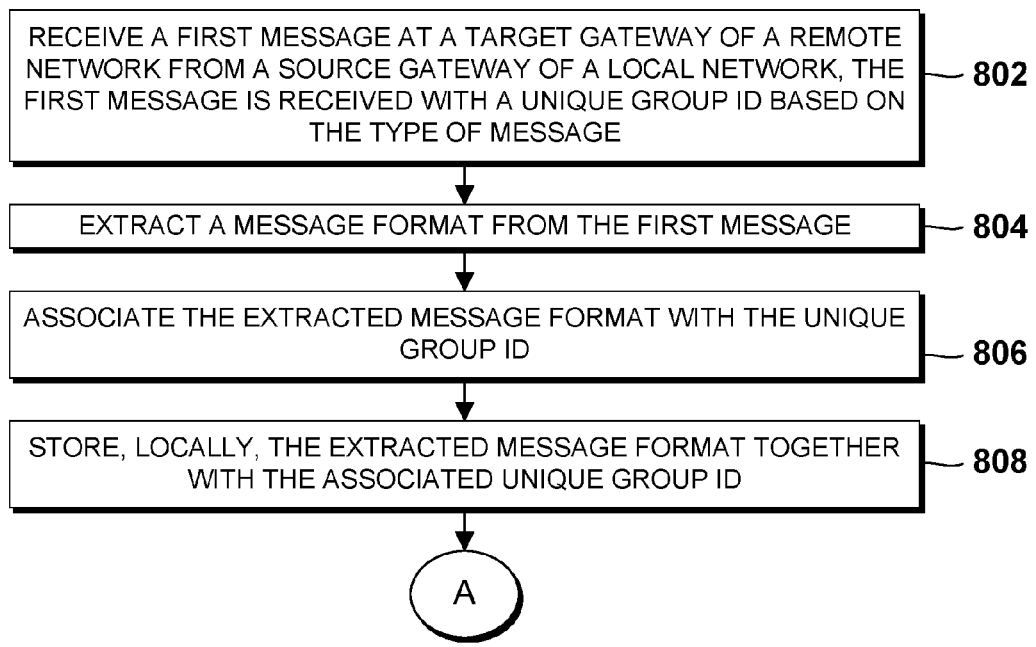
FIGS. 8A and 8B are a flowchart depicting the operational steps of the target gateway when it receives a message from the source gateway having an unknown group ID, in accordance with an embodiment of the present invention.
Figure 8B:
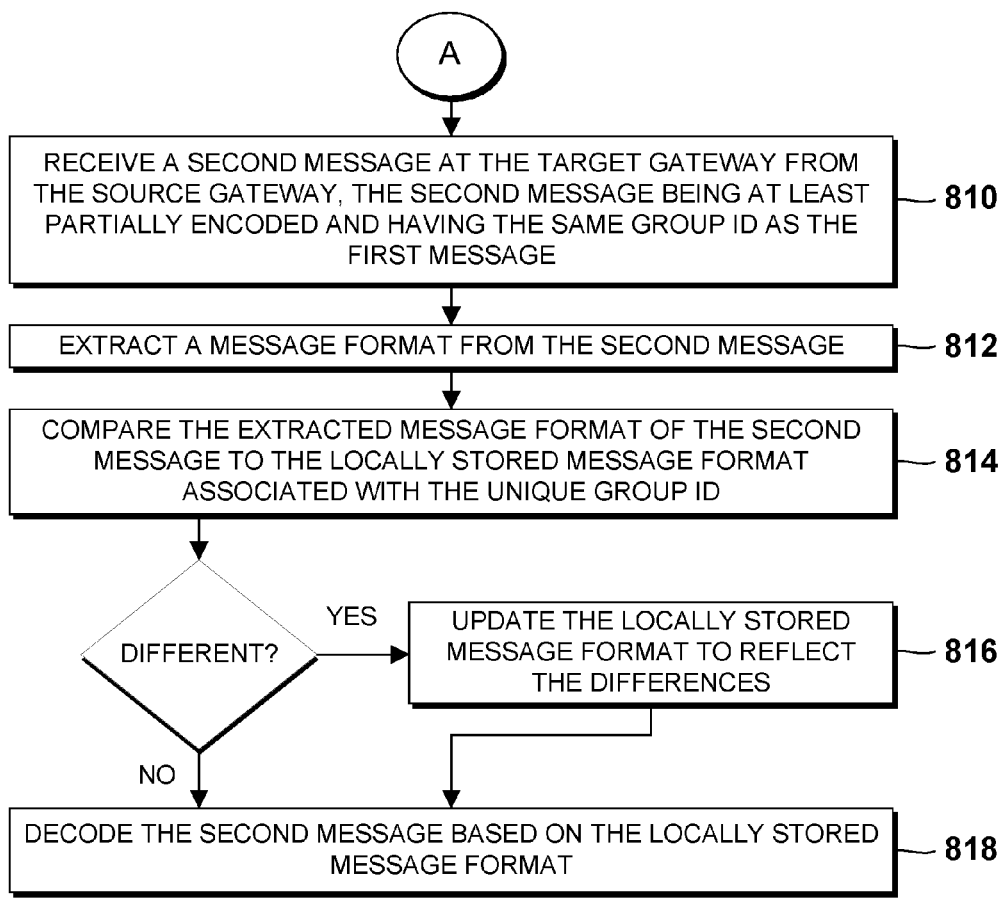

Referring now to FIGS. 8A and 8B, a flowchart depicting the operational steps of the target gateway 110 when it receives a message from the source gateway 108 having an unknown group ID is shown according to an embodiment of the present invention. For purposes of the present description a message is said to have an unknown group ID when the target gateway 110 has not yet received a message of its particular type.

The target gateway 110 receives a first message from the source gateway 108 (at 802). The first message is received at the target gateway 110 with a unique group ID based on the type of message, as described above. The target gateway 110 then extracts the message format from the first message (at 804), and associates the extracted message format with the unique group ID (at 806). Both the message format together with the unique ID are stored locally at the target gateway 110 (at 808).

The target gateway 110 then receives a second message form the source gateway 108 (at 810). The second message is at least partially encoded and has the same group ID as the first message. The target gateway 110 extracts the message format from the second message (at 812), and then compares the extracted message format to a locally stored message format associated with the unique group ID (at 814).

If the extracted message format is different from the locally stored message format, then the target gateway 110 updates the locally stored message format to reflect the differences (at 816). It should be noted that updating the locally stored message format may include adding message elements, subtracting message elements, or both. If the extracted message format is not different from the locally stored message format, then the target gateway 110 decodes the second message based on the locally stored message format (at 818).

Figure 9:
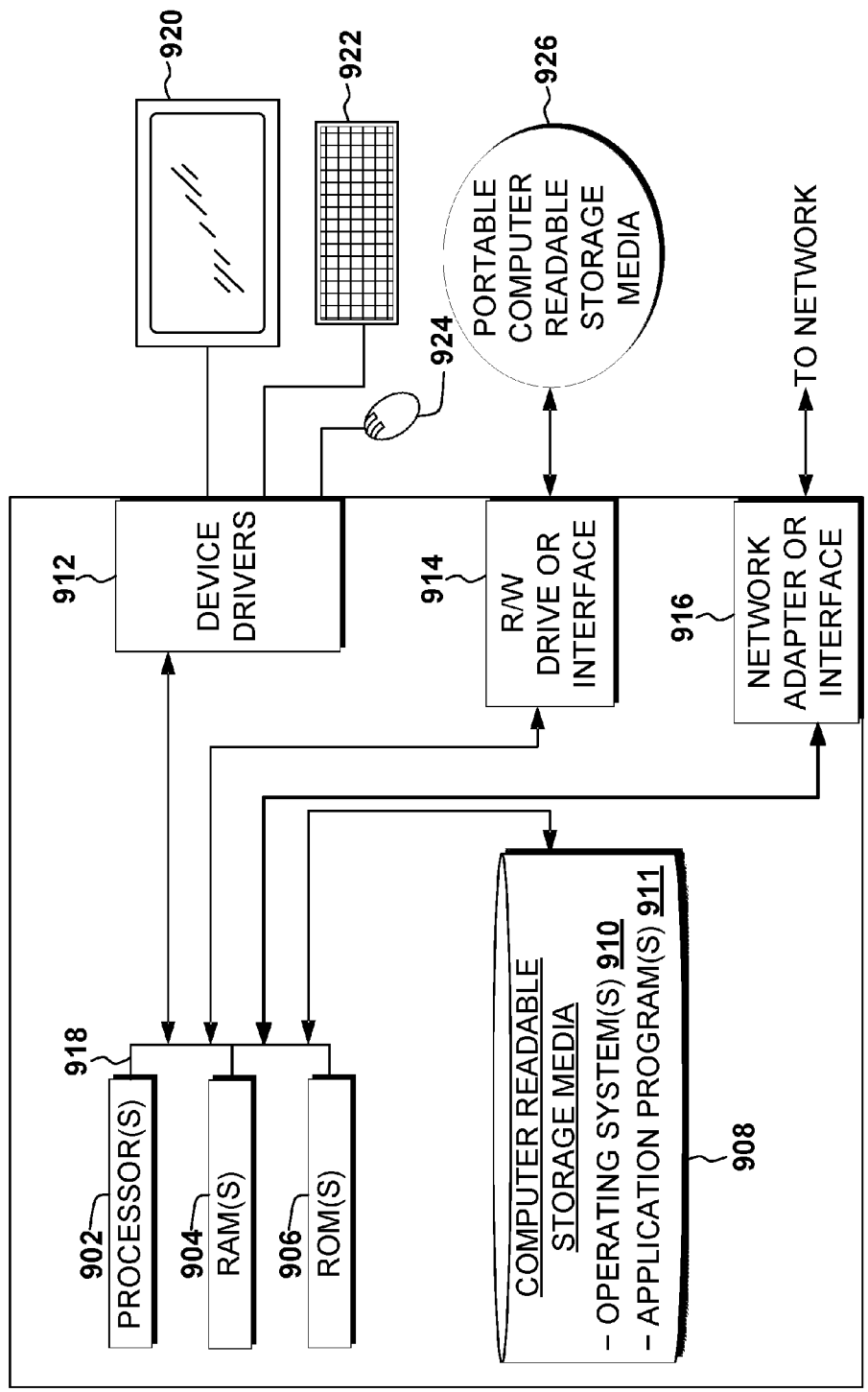
FIG. 9 is a block diagram of an exemplary computing device, in accordance with an exemplary embodiment.

Referring now to FIG. 9, a block diagram of components of a computing device, such as the client computer 102 or the server computer 104, of the system 100 of FIG. 1, in accordance with an embodiment of the present invention is shown. It should be appreciated that FIG. 9 provides only an illustration of one implementation and does not imply any limitations with regard to the environments in which different embodiments may be implemented. Many modifications to the depicted environment may be made.

The computing device may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 914 to read from and write to one or more portable computer readable storage media 926. Application programs 911 on the computing device may be stored on one or more of the portable computer readable storage media 926, read via the respective R/W drive or interface 914 and loaded into the respective computer readable storage media 908.

The computing device may also include a network adapter or interface 916, such as a TCP/IP adapter card or wireless communication adapter (such as a 4G wireless communication adapter using OFDMA technology). Application programs 911 on the computing device may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The computing device may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing information between a local network and a remote network, the method comprising:
    receiving a message at a source gateway of the local network, the message comprises message data corresponding to a plurality of message elements;
    assigning a unique group ID based on a type of message received at the source gateway, the unique group ID is unique to each message type and different message types are assigned different unique group IDs;
    extracting a message format from the received message, the message format defines how the message data is organized with respect to the message elements;
    associating the extracted message format with the unique group ID, the extracted message format is unique to each message type such that messages assigned the same group ID have the same message format;
    storing, locally at the source gateway of the local network, the extracted message format together with the associated unique group ID;
    establishing a dedicated connection between the source gateway and a target gateway of the remote network based on the unique group ID, the dedicated connection is specific to and established only for the delivery of messages having the same message format and the same unique group ID;
    encoding the message based on the stored message format, such that all messages having the same unique group ID are encoded based on the extracted message format stored locally at the source gateway; and
    sending the encoded message from the source gateway to the target gateway across the dedicated connection.

2. The method of claim 1, wherein encoding the message based on the extracted message format comprises:
    decreasing the size of the message by replacing message element tags associated with each message element with unique codes, after which the message data is associated with the unique codes without the message element tags.

3. The method of claim 1, wherein the type of message is based on any message characteristic used to distinguish one message from another.

4. The method of claim 1, wherein sending the encoded message from the source gateway to the target gateway across the dedicated connection comprises:
    sending only a portion of the encoded message to the target gateway.

5. A method for processing information between a local network and a remote network, the method comprising:
    receiving a first message at a source gateway of the local network, the first message comprises message data corresponding to a plurality of message elements;
    selecting a group ID from a list of predefined group IDs stored locally at the source gateway based on the type of message received, the unique group ID is unique to each message type and different message types are assigned different unique group IDs;
    extracting a message format from the received message, the extracted message format defines how the message data is organized with respect to the message elements the extracted message format is unique to each message type such that messages assigned the same group ID have the same message format;
    comparing the extracted message format to a locally stored message format associated with the selected group ID;
    updating the locally stored message format to reflect differences between the extracted message format and the locally stored message format;
    encoding the message based on both the extracted message format and the locally stored message format, wherein old message elements are encoded without encoding new message elements; and
    sending the encoded message to a target gateway of the remote network across a preexisting dedicated connection between the source gateway and the target gateway, the preexisting dedicated connection is specific to and used only for the delivery of messages having the same message format and the same unique group ID.

6. The method of claim 5, wherein encoding the message based on both the extracted message format and the locally stored message format comprises:
 decreasing the size of the message by replacing message element tags associated with each message element with unique codes, after which the message data is associated with the unique codes without the message element tags.

7. The method of claim 5, wherein the type of message is based on any message characteristic used to distinguish one message from another.

8. The method of claim 5, wherein sending the encoded message to the target gateway across the preexisting dedicated connection comprises:
 sending only a portion of the encoded message to the target gateway.

9. The method of claim 5, further comprising:
 storing, locally, encoded message data of the received first message in a latest value cache;
 receiving a second message at the source gateway, the second message is of the same message type as the first message such that both the first message and the second message have identical message formats and identical message elements, each message element comprising a single data value;
 encoding the received second message based on the determined message format associated with the selected group ID;
 comparing the encoded second message to the message data of the first message saves in the latest value cache; and
 sending only a portion of the encoded second message based on comparing the encoded second message to the message data of the first message, wherein the portion of the encoded second message only includes data values of the second message which are different from the data values of the first message.

10. A method for processing information between a local network and a remote network, the method comprising:
 receiving, by a target gateway of the remote network, a first message from a source gateway of the local network, the first message comprises message data corresponding to a plurality of message elements and is received with a unique group ID assigned based on a message type, wherein the first message is received from the source gateway via a dedicated connection specific to and used only for the delivery of messages having the same message format and the same unique group ID;
 extracting a message format from the first message, the extracted message format defines how the message data is organized with respect to the message elements and is unique to each message type such that messages assigned the same group ID have the same message format;
 associating the extracted message format with the unique group ID;
 storing, locally at the target gateway of the remote network, the extracted message format together with the associated unique group ID, the unique group ID is unique to each message type and different message types are assigned different unique group IDs;
 receiving a second message at the target gateway from the source gateway, the second message being at least partially encoded and having the same group ID as the first message;
 extracting a message format from the second message;
 comparing the extracted message format of the second message to the locally stored message format associated with the unique group ID;
 updating the locally stored message format to reflect differences between the extracted message format of the second message and the locally stored message format; and
 decoding the second message based on the locally stored message format.

11. The method of claim 10, wherein decoding the second message based on the locally stored message format comprises:
 replacing unique codes of the second message with message element tags from the locally stored message format, after which the message data of the second message is associated with the message element tags without the unique codes.

12. The method of claim 10, further comprising:
 storing locally, in a latest value cache, encoded message data for the first and second messages, latest value cache is specific to the unique group ID and a different latest value cache is used for messages having a different group ID;
 receiving a third partially encoded message from the source gateway with the same group ID, the third message is an incremental message update comprising fewer message elements than the first message; and
 restoring the third partially encoded message to its full version by decoding the incremental message update, the full version is based on both the encoded message data stored in the latest value cache and the decoded incremental message updates.

13. The method of claim 10, wherein the type of message is based on any message characteristic used to distinguish one message from another.

14. The method of claim 10, wherein the first message and the second message comprise sensor data from a wireless sensor network.

* * * * *